Sept. 5, 1950  R. K. SUPER  2,520,978
ADHESIVE BONDING METHOD
Filed April 4, 1945
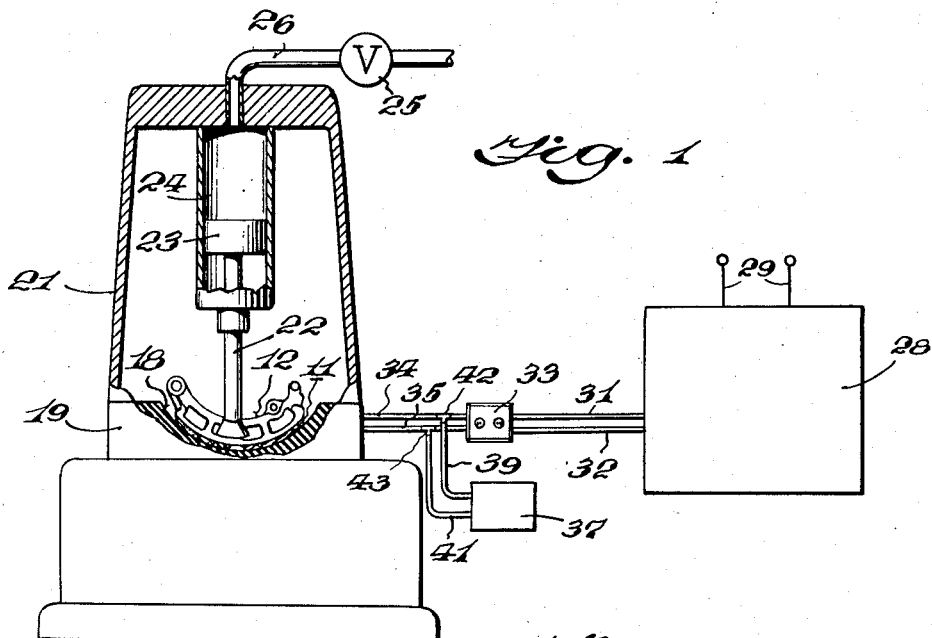
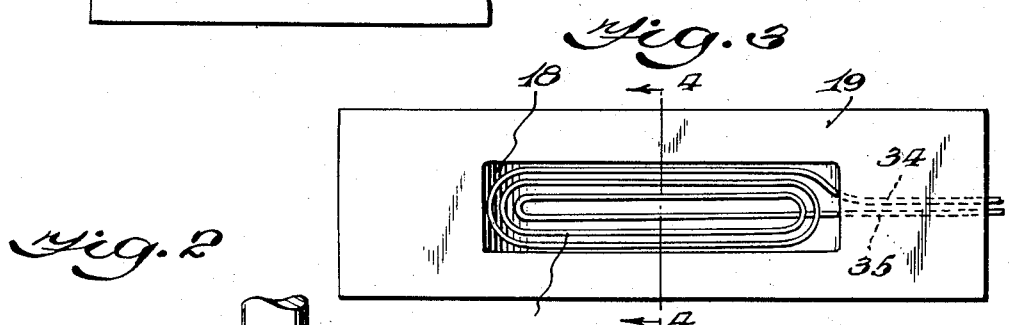
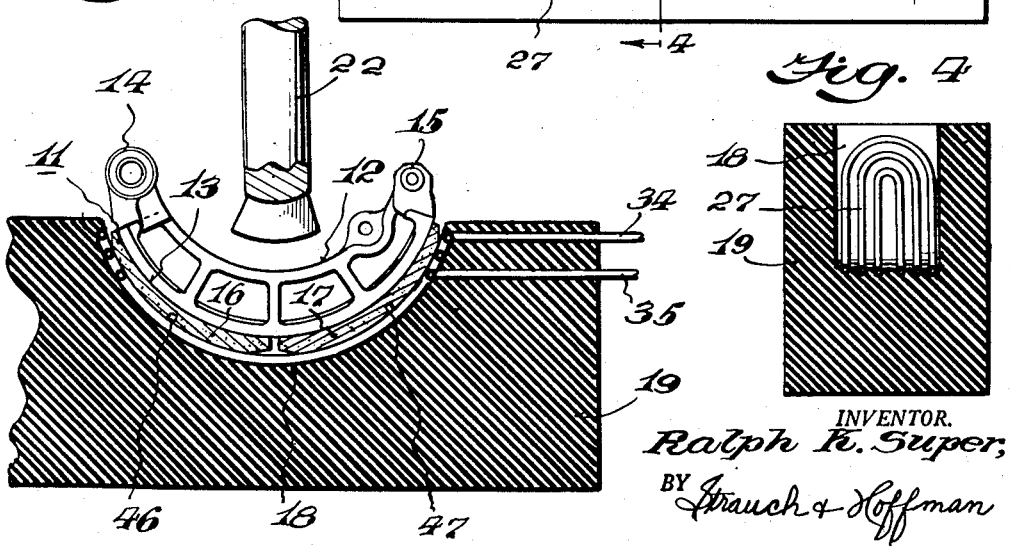
INVENTOR.
Ralph K. Super,
BY Strauch & Hoffman
Attorneys Patented Sept. 5, 1950

2,520,978

UNITED STATES PATENT OFFICE 2,520,978

ADHESIVE BONDING METHOD

Ralph K. Super, Detroit, Mich., assignor to The Timken-Detroit Axle Company, Detroit, Mich., a corporation of Ohio Application April 4, 1945, Serial No. 586,529

9 Claims. (Cl. 154—126.5)

This invention relates generally to a method for adhesively securing a non-conducting material to a part made of electrically conducting material and particularly concerns an improved method for cementing brake linings to metal brake shoes.

Among the advantages of cemented brake linings, as compared to riveted linings, are: longer wear for linings of the same thickness, increased braking area for linings of the same dimensions, and less damage to brake drums.

During operation of the brake, the cement is subjected to severe conditions of heat and shearing stress. It is desirable, therefore, to use a thermally activated, heat resistant adhesive for bonding the lining to the brake shoe. However, care must be exercised in activating the cement to avoid heating the brake lining material above its curing temperature. In quantity production, the brake shoes must be handled immediately after attachment of the linings, so it is desirable to avoid excessively heating the body of the shoe while activating the cement.

As the invention is particularly useful for cementing brake linings to brake shoes, this application of the invention has been chosen for purposes of the following description. It should be understood, however, that reference to the brake lining is intended to include any part made entirely or mainly of non-conducting material, and any electrical conductor capable of being inductively heated may be used instead of a brake shoe without departing from the spirit of the invention.

A non-conducting part, within the spirit of the present invention, may be a part composed entirely of electrically insulating material or may contain small amounts of conducting material in quantities insufficient to make the part electrically conductive. For example, a brake lining of molded synthetic resin and asbestos may contain dispersed conductive particles or pieces of conductive material for increasing wear resistance, but such does not render it electrically conductive.

It is a major object of the invention to provide a method for thermally activating an adhesive to bond a non-conducting part to a conducting part without excessively heating either of the two parts.

An important object of the invention is to provide a method for attaching a brake lining to a brake shoe by thermo-setting a cement between the lining and shoe without materially heating the lining or body of the shoe, and the novel article produced thereby.

Another object of the invention is to provide a highly efficient method for thermally activating an adhesive bond.

A more specific object of the invention is to provide a method for speedily attaching a brake lining to a brake shoe in which the adhesive is heat activated by inductively heating the brake shoe substantially only at the surface adjacent the adhesive.

Other and further objects will appear from the following specification and accompanying drawing, wherein there is shown, for purposes of illustration, apparatus embodying the invention in its preferred form for attaching a brake lining to a brake shoe.

In the drawing:

Fig. 1 is an elevation view, partially in section, showing apparatus for attaching brake linings to brake shoes in accordance with this invention;

Fig. 2 is an enlarged section through the base portion of the apparatus showing the arrangement of the brake shoe and the brake lining also in section;

Fig. 3 is a top plan view of the base portion of the apparatus of Fig. 1 showing the arrangement of an induction coil imbedded therein; and Fig. 4 is a transverse section through the center of the induction coil.

In accordance with the invention in its preferred form, an adhesive is placed between mating surfaces of the brake lining (non-conducting part) and the brake shoe (conducting part). The surfaces to be joined are then placed under considerable pressure and the brake shoe is heated in a restricted zone along the adhesive surface to thermally activate the adhesive and secure the bond. This heating may be acomplished inductively by concentrating a high-frequency electromagnetic flux in the skin of the brake shoe lying along the surface to be cemented. Preferably, power for heating the brake shoe is applied for only a short time interval, so that the total heat may be dissipated without excessively heating the whole brake shoe or the lining.

When a relatively thick lining is used, its stiffness may tend to pull the lining away from the shoe. To avoid this separation, the lining may be rendered more flexible by placing one or more cuts across the braking surface of the lining, leaving only a relatively thin flexible web in contact with the brake shoe.

Referring to the drawing, there is shown in Fig. 1 one form of apparatus which may be used in practicing the invention to cement a brake lining 11 onto a brake shoe 12. A brake shoe of this type is usually a metal casting having a smooth cylindrically shaped surface 13 (Fig. 2), to which the brake lining 11 is to be attached, and provided with necessary fittings 14 and 15 for mounting and actuating the brake. The brake lining is preferably formed in two segments 16 and 17 of a molded plastic compound including asbestos. These segments are arranged adjacent each other to provide a friction surface covering substantially the entire surface 13 of the brake shoe.

In attaching the brake lining 11 to the shoe 12, an adhesive is placed between the surfaces to be bonded. This may be accomplished by coating a suitable adhesive on the surface 13 of the shoe 12 and/or the surfaces of the segments 16 and 17 which are to be bonded to the shoe. Preferably, the surface 13 of the shoe and also the surfaces of the segments 16 and 17 are coated with a plastic type cement, such as a thermosetting resin.

After the coating of adhesive or cement has dried, the two segments 16 and 17 are placed in a recess 18 formed in a bed or base 19 of an arbor press 21. The bed 19 is made of suitable electrically insulating material, such as cement, Bakelite or other plastic, and the recess 18 has its surface shaped to conform to the friction surface of the brake lining 11 when it is applied to the brake shoe 12. To insure a uniform bond between the lining and the brake shoe, pressure is applied to the brake shoe 12, as by a piston rod 22, which may be actuated by piston 23 in pneumatic cylinder 24. The pressure applied to the brake shoe may be controlled by a valve 25 in compressed air line 26, which supplies pressure fluid to the cylinder 24. It has been found that a pressure in the neighborhood of 100 pounds per square inch is satisfactory to produce a uniform bond.

For purposes of heating the brake shoe to set the cement, an induction coil 27 is imbedded in the insulating block 19. This coil consists of a number of turns of hollow metal tubing wound in spiral fashion with all of the turns lying in a surface of revolution having a radius corresponding to that of the recess 18. Thus, all of the turns of the induction coil lie substantially flush with the surface of the recess 18, and therefore have a shape which conforms to that of the brake lining 11 and the bonding surface 13 of the brake shoe 12. This arrangement of the coil is such that, when it is supplied with a suitable current, it produces a concentrated electromagnetic field of substantially uniform density and coextensive with the surfaces of the lining 11 and the brake shoe 12 which are to be bonded together.

In order to heat only a restricted zone of the brake shoe 12 which is adjacent the bonding surface 13, the induction coil 27 is excited from a high-frequency generator 28, which may be supplied with power from a suitable electrical source 29 and is of a conventional oscillator and power amplifier type for producing electrical oscillations having a frequency of, for example, two megacycles per second. This high-frequency energy from the generator 28 may be supplied by conductors 31 and 32 through a push-button type timing switch 33, of conventional type, to terminal conductors 34 and 35 of the hollow tubing forming the induction coil 27.

When the timing switch 33 is actuated to connect the high-frequency generator 28 to the induction coil 27, the concentrated high-frequency electromagnetic field produced by the coil 27 induces heating currents in the metallic brake shoe 12, which is usually of iron. Due to the "skin" effect of high-frequency electrical currents, the heating current induced in the brake shoe are restricted mainly to the "skin" of the brake shoe. Therefore, only that narrow zone of the brake shoe 12 which lies along the bonding surface 13 is inductionally heated by energy from the coil 27. Since this zone is adjacent the bonding surfaces of the brake shoe and lining, heat is conducted to the cement or adhesive and raises the temperature of the cement until polymerization takes place. Polymerization of suitable thermo-setting plastic cements now available for this purpose takes place at about 325–350° F. It is only necessary, therefore, to apply high-frequency energy to the induction coil until the cement is heated to its setting temperature. With a high-frequency generator having a capacity of 20 kilowatts, it has been found that, for average size brake shoes, the cement is polymerized and the lining bonded to the shoe within a time period of approximately six seconds.

Since heat is induced only in a restricted zone of the brake shoe and the heating period is relatively short, the total heat may be dissipated through other portions of the shoe and also through the lining without overheating either the shoe or the lining. It is possible to handle the brake shoe, with the lining attached, immediately after the switch 33 disconnects the high-frequency generator from the induction coil. This timing switch is set to automatically disconnect the generator from the coil after the time interval necessary to set the cement. Of course, this time may vary for different operating conditions and sizes of brake shoes, so the timing switch 33 is preferably adjustable to provide for different time intervals.

The lining 11, being formed of molded plastic material, must not be heated above its curing temperature, which is about 450° F. for standard brake linings. To keep the induction coil 27 cool and to carry off heat from the lining 11, a cooling fluid, such as water, may be circulated through the hollow conductor forming the windings of the coil. For this purpose, a conventional pump 37 is connected through suitable conduits 39 and 41 and couplings 42 and 43 to the terminal conductors 34 and 35 of the coil 27. It will be necessary, of course, to plug the terminal conductors 34 and 35 between the couplings and the switch 33 to avoid circulation of liquid away from the coil.

When thick brake linings are applied to the brake shoe, they have a tendency to pull away and break the cement bond between the lining and the shoe due to stresses set up in shaping the lining to the shoe. To avoid this, a saw cut, such as that shown at 46 and 47, in the segments 16 and 17 may be placed across the face of the lining, leaving only a thin flexible web cemented to the shoe.

As will be apparent from the foregoing description, the present invention provides for rapid production steps in attaching a non-conducting part to an electrical conductor and is particularly useful where the electrical conductor has sufficiently great mass to dissipate the heat required for thermally activating the adhesive, as is the case in applying brake linings to brake shoes. Since a minimum of heat is used, and power is consumed solely during the short heating interval, the efficiency of apparatus embodying the invention is excellent. Quantity production of brake shoes with cemented linings is greatly facilitated because the bonded parts may be removed immediately after heating without the use of special handling equipment.

If the induction coil 27 is larger than the surface of the brake shoe to be heated, stray fields may be eliminated by masking the edges of the coil with suitable high-frequency shielding material. Brake shoes in various ranges of sizes may be accommodated by simply changing the base in the arbor press. Thus, a series of bases, each with a recess and coil for particularly shaped brake shoes, may easily be placed in the press and coupled to the high-frequency generator.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalencey of the claims are therefore intended to be embraced therein.

What is claimed and desired to be secured by United States Letters Patent is:

1. In a method of bonding an electrically conductive member to a substantially electrically non-conductive member which has been cured at a predetermined temperature to attain a desired physical condition, the steps of assembling said members under pressure with a layer of thermo-setting adhesive between coextensive surfaces of said members, subjecting said assembly to a concentrated high frequency electromagnetic field for speedily heating by induction a thin surface zone of said conductive member adjacent said adhesive layer for setting said adhesive to bond the members together at said surfaces and maintaining the temperature at said surfaces below that which will alter said physical condition.

2. In a method of bonding a cured preformed brake lining element to a metallic brake shoe, the steps of assembling the shoe and lining under pressure with a layer of thermosetting adhesive between coextensive surfaces and subjecting the assembly to a high frequency electromagnetic induction field for setting the cement while maintaining the temperature at said surfaces below substantially 450° F.

3. The method of securing an electrically conductive part to a part which is substantially nonconductive electrically which comprises placing the parts together under pressure with a thermosetting adhesive between coextensive surfaces to be joined, and providing a high frequency field of electromagnetic energy for inductively heating substantially only the adhesive contacting surface of said electrically conductive part for a predetermined short interval to thermally set said adhesive and bond said parts together, while maintaining said electrically non-conductive part below a predetermined temperature.

4. The method of attaching a surface of a heat treated part which is substantially electrically non-conductive to a coextensive surface of an electrically conductive part of substantial mass, which comprises providing between said surfaces a layer of thermo-setting adhesive, pressing said surfaces together, and applying a high frequency electromagnetic field for inductively heating said electrically conductive part in only a relatively narrow zone at its adhesive contacting surface for a predetermined short period to thermally set the adhesive while maintaining the temperature at said zone below a predetermined level corresponding to the temperature at which said electrically non-conductive part was heat treated.

5. The method of cementing a preformed heat cured brake lining to a metallic brake shoe which comprises assembling the brake lining on the brake shoe under pressure with a thermo-setting adhesive between the surfaces to be joined, applying a high frequency electromagnetic field for inductively heating said brake shoe only in a narrow zone adjacent its adhesive contacting surface to thermally set the adhesive and bond the lining to the shoe, and maintaining the temperature at said zone below the curing temperature of said lining.

6. The method of attaching a heat cured brake lining of a material that is substantially electrically non-conductive to an electrically conductive brake shoe by cementing a surface of the lining to a surface of the shoe, which comprises coating at least one of said surfaces with a thermo-setting adhesive material, pressing said surfaces together, and heating said brake shoe by electromagnetic induction only in a narrow zone adjacent its adhesive material contacting surface sufficiently to thermally set the adhesive material, while maintaining the temperature at said zone below the curing temperature of said lining.

7. The method of attaching a substantially electrically non-conductive part to an electrically conductive part of relatively large mass by adhesively securing a surface of the non-conductive part to a surface of the conductive part, which comprises pressing the parts together with a thermo-setting adhesive between the surfaces to be joined, and subjecting said parts to a concentrated field of high frequency electromagnetic energy with said surface of the conducting part nearer to said source of energy than other portions of said conducting part for inductively heating only a relatively thin zone of said conductive part adjacent said surfaces to thermally set the adhesive while maintaining said non-conductive part below a predetermined temperature.

8. The method of attaching a preformed heat cured brake lining to a metallic brake shoe by cementing a surface of the lining to a surface of the shoe, which comprises pressing said surfaces together with a thermo-setting adhesive therebetween, and for a very short time interval subjecting the lining and the shoe to a concentrated field of high frequency electromagnetic energy with said surface of the shoe nearer to the source of said energy than other portions of said shoe for inductively heating only a narrow zone of said shoe adjacent said surface sufficient to thermally set the adhesive while maintaining the temperature at said zone below the curing temperature of said lining.

9. In a method of adhesively bonding a surface of a preformed substantially electrically non-conductive heat cured brake lining element to the surface of a metal brake shoe, the steps of assembling said lining and shoe in desired relation with said surfaces adjacent and separated only by a film of thermo-setting adhesive, and subjecting said assembly to a quick high power burst of high frequency electromagnetic induction energy in such manner as to raise the temperature of substantially only said brake shoe surface sufficiently high to speedily set said adhesive to securely bond said surfaces together while maintaining the temperature at said surfaces below the curing temperature of said lining.

RALPH K. SUPER.

REFERENCES CITED

The following references are of record in the file of this patent:

UNITED STATES PATENTS

| Number | Name | Date |
|---|---|---|
| 1,682,319 | Bluhm | Aug. 28, 1928 |
| 1,806,846 | Fox | May 26, 1931 |
| 2,067,086 | Hoffman | Jan. 5, 1937 |
| 2,125,316 | Ronci | Aug. 2, 1938 |
| 2,238,053 | Hart | Apr. 15, 1941 |
| 2,317,597 | Ford | Apr. 27, 1943 |
| 2,324,068 | Crandell | July 13, 1943 |
| 2,416,427 | Bonawit | Feb. 25, 1947 |

FOREIGN PATENTS

| Number | Country | Date |
|---|---|---|
| 390,336 | Great Britain | Apr. 6, 1933 |

OTHER REFERENCES

Ser. No. 229,798, Baseler (A. P. C.), published May 11, 1943.

Coils, Oct. 1943 issue of Electronics, pp. 112, 113, 299, and 300.